US009485202B2

(12) United States Patent
LeCroy et al.

(10) Patent No.: US 9,485,202 B2
(45) Date of Patent: *Nov. 1, 2016

(54) ALERTING RECIPIENTS TO ERRORS OCCURRING WHEN ACCESSING EXTERNAL SERVICES

(71) Applicant: Microsoft Technology Licensing, LLC, Redmond, WA (US)

(72) Inventors: Jonathan LeCroy, Seattle, WA (US); Wilson Li, Redmond, WA (US); Mayank Mehta, Redmond, WA (US); Ayse Yesim Koman, Chicago, IL (US); Victor William Habib Boctor, Redmond, WA (US); Mayerber Loureiro De Carvalho Neto, Kirkland, WA (US); Christopher Barnes, Redmond, WA (US); Frank David Byrum, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/285,897

(22) Filed: May 23, 2014

(65) Prior Publication Data

US 2014/0258435 A1    Sep. 11, 2014

Related U.S. Application Data

(63) Continuation of application No. 12/971,124, filed on Dec. 17, 2010, now Pat. No. 8,762,795.

(51) Int. Cl.
*G06F 11/00* (2006.01)
*H04L 12/58* (2006.01)
*G06F 11/07* (2006.01)

(52) U.S. Cl.
CPC ........... *H04L 51/04* (2013.01); *G06F 11/0784* (2013.01)

(58) Field of Classification Search
CPC .................................................. G06F 11/0784
USPC ............................................... 714/4.1, 48, 57
See application file for complete search history.

(56) References Cited

U.S. PATENT DOCUMENTS 6,141,777 A    10/2000    Cutrell et al.
6,907,551 B2    6/2005    Katagiri et al.
(Continued)

OTHER PUBLICATIONS

"Configurability in SaaS for an Electronic Contract Management Application" accessed at http://www.wseas.us/e-library/conferences/2010/Cambridge/ICNVS/ICNVS-36.pdf; accessed on Sep. 14, 2010, 7 pages.
(Continued)

*Primary Examiner* — Joshua P Lottich
(74) *Attorney, Agent, or Firm* — Anand Gupta; Tom Wong; Micky Minhas

(57) ABSTRACT

A hosting provider operates a server system that provides a service to one or more tenants. The server system receives configuration data from the tenants. As part of providing the service to a given tenant, the server system attempts to access an external service due to the configuration data received from the given tenant identifying the external service. Service access errors can occur when attempting to access the external service. In response to determining that an error has occurred when attempting to access the external service, the server system sends a service access alert to a recipient associated with the given tenant. The service access alert notifies the recipient that the error has occurred.

20 Claims, 6 Drawing Sheets

(56) References Cited

U.S. PATENT DOCUMENTS

| | | | |
|---|---|---|---|
| 7,461,297 | B2 | 12/2008 | McLellan et al. |
| 7,623,848 | B2 | 11/2009 | Rosenfelt et al. |
| 7,793,141 | B1 | 9/2010 | Miller |
| 7,886,000 | B1 | 2/2011 | Polis et al. |
| 8,291,267 | B2 | 10/2012 | Blum |
| 8,347,145 | B2 | 1/2013 | Fitzgerald et al. |
| 8,370,580 | B2 | 2/2013 | Mobarak et al. |
| 8,762,795 | B2 | 6/2014 | LeCroy et al. |
| 2002/0073364 | A1 | 6/2002 | Katagiri et al. |
| 2004/0153713 | A1 | 8/2004 | Aboel-Nil et al. |
| 2006/0005063 | A1 | 1/2006 | Patrick et al. |
| 2006/0248407 | A1 | 11/2006 | Adams et al. |
| 2008/0256607 | A1 | 10/2008 | Janedittakarn et al. |
| 2008/0313491 | A1 | 12/2008 | Adams et al. |
| 2009/0228579 | A1 | 9/2009 | Sanghvi |
| 2010/0070479 | A1 | 3/2010 | Maitino |
| 2010/0235676 | A1 | 9/2010 | Aboel-Nil et al. |
| 2011/0239057 | A1 | 9/2011 | Thimmappa et al. |
| 2011/0271153 | A1 | 11/2011 | Polis et al. |
| 2012/0042218 | A1 | 2/2012 | Cinarkaya et al. |
| 2012/0191918 | A1 | 7/2012 | Mobarak et al. |

OTHER PUBLICATIONS

"Configuring a Cisco Unity Connection Cluster" accessed at: http://www.cisco.com/en/US/docs/voice_ip_comm/connection/7x/cluster_administration/guide/7xcuccag005.pdf; published May 2009, 4 pages.

"JumpBox for the Nagios 3.x Network Monitoring System" accessed at: http://www.jumpbox.com/app/nagios3; Accessed on Sep. 13, 2010, 3 pages.

"Microsoft Exchange Online" accessed at: http://www.microsoft.com/online/exhange-online.aspx; accessed on Sep. 13, 2010, 2 pages.

"Microsoft System Center Operations Manager" accessed at http://www.microsoft.com/systemcenter/en/us/operations-manager.aspx; accessed on Sep. 13, 2010, 2 pages.

"Rackspace Email" accessed at: http://community.spiceworks.com/help/Rackspace_Email; accessed on Sep. 13, 2010, 5 pages.

"What are Mithi Hosted Email Services?" accessed at: http://mithi.com/support-services/hosting/hosted-email-services.html; accessed on Sep. 13, 2010, 3 pages.

U.S. Appl. No. 12/971,124, Office Action mailed Mar. 21, 2013, 11 pages.

U.S. Appl. No. 12/971,124, Amendment and Response filed Jun. 21, 2013, 9 pgs.

U.S. Appl. No. 12/971,124, Office Action mailed Jul. 25, 2013, 6 pgs.

U.S. Appl. No. 12/971,124, Amendment and Response filed Oct. 4, 2013, 8 pgs.

U.S. Appl. No. 12/971,124, Office Action mailed Oct. 17, 2013, 7 pgs.

U.S. Appl. No. 12/971,124, Amendment and Response filed Jan. 17, 2014, 8 pgs.

U.S. Appl. No. 12/971,124, Notice of Allowance mailed Feb. 12, 2014, 5 pgs.

ALERTING RECIPIENTS TO ERRORS OCCURRING WHEN ACCESSING EXTERNAL SERVICES

CROSS-REFERENCE TO RELATED APPLICATIONS

This application is a continuation of and claims priority to U.S. patent application Ser. No. 12/971,124, now U.S. Pat. No. 8,762,795 issued on Jun. 24, 2014, entitled "ALERTING RECIPIENTS TO ERRORS OCCURRING WHEN ACCESSING EXTERNAL SERVICES," filed Dec. 17, 2010, which is incorporated herein by reference in its entirety.

BACKGROUND

In recent years, hosted services have been growing in popularity. In the hosted services model, a hosting provider manages the hardware and software needed to provide a service to a consumer via a communications network, such as the Internet. Consumers of hosted services are known as tenants. Hosting providers can provide a wide variety of services to tenants according to this model. For example, a hosting provider can manage hardware and software needed to provide hosted email services, document creation and storage services, unified communications services, and other types of services to tenants.

The hosted services model can save the tenants from the expense of installing and maintaining the hardware and software needed to provide a service. Furthermore, the same set of hardware and software can provide a hosted service to multiple tenants. Thus, the hosting provider's expense in installing and maintaining the hardware and software can be divided among the tenants.

In some circumstances, the tenants configure a hosted service to access services provided by entities other than a hosting provider who provides the hosted service. For example, a tenant can configure the hosted service to retrieve encryption key data from a server operated by the tenant.

SUMMARY

A hosting provider operates a server system that provides a service to one or more tenants. The server system receives configuration data from the tenants. The configuration data identify services that are not provided by the server system. As part of providing the service to a given tenant, the server system attempts to access an external service due to the configuration data received from the given tenant identifying the external service. Errors can occur when attempting to access the external service. In response to determining that an error has occurred when attempting to access the external service, the server system sends a service access alert to an administrator associated with the given tenant. The service access alert notifies the administrator that the error has occurred. Consequently, the administrator may be able to rectify the error more quickly than if the administrator learned of the error from end users associated with the tenant.

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

DETAILED DESCRIPTION

Figure 1:
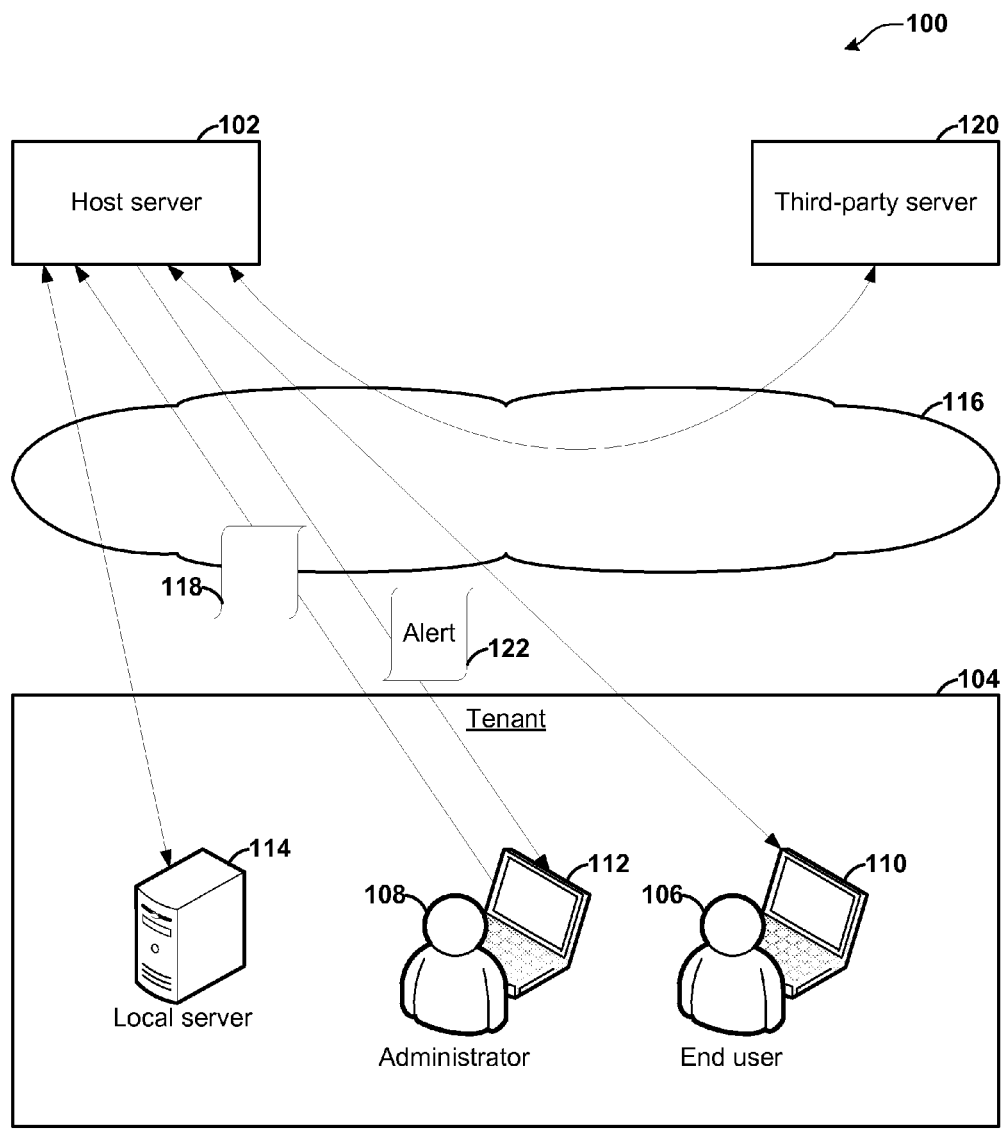
FIG. 1 is a block diagram illustrating an example system.

FIG. 1 is a block diagram illustrating an example system 100. As illustrated in example of FIG. 1, the system 100 comprises a host server 102 and a tenant 104. The host server 102 a server system comprising one or more computing devices. In some embodiments, the host server 102 comprises one or more computing devices of a type described below with regard to the example of FIG. 6. The tenant 104 is an entity, such as a business organization, a governmental organization, a non-profit organization, or another type of entity.

The tenant 104 is associated with an end user 106 and an administrator 108. The end user 106 uses a client device 110. The administrator 108 is a user of a client device 112. In some embodiments, the client device 110 and the client device 112 comprise one or more computing devices of the type described below with regard to the example of FIG. 6. The end user 106 and the administrator 108 can, in various embodiments, be associated with the tenant 104 in various ways. For example, the end user 106 and/or the administrator 108 can be employees of the tenant 104, owners of the tenant 104, contractors for the tenant 104, clients of the tenant 104, users of services provided by the tenant 104, or be otherwise associated with the tenant 104. It should be appreciated that the tenant 104 can be associated with individuals in addition to the end user 106 and the administrator 108.

Furthermore, the tenant 104 is associated with a local server 114. In some embodiments, the local server 114 is located on a premises of the tenant 104, such as a building owned or occupied by the tenant 104. The local server 114 comprises one or more computing devices. In some embodiments, the local server 114 comprises one or more computing devices of the type described below with regard to the example of FIG. 6. The local server 114 provides a local service. In various embodiments, the local service can comprise various types of services. For example, the local server 114 can provide a lightweight directory access protocol (LDAP) service that provides access to a directory of information regarding individuals associated with the tenant 104. In another example, the local server 114 can provide a security service that uses private encryption keys associated with the tenant 104 to decrypt messages received by the host server 102.

The system 100 comprises a network 116. The network 116 enables the host server 102 to communicate with the client device 110, the client device 112, and the local server 114. In various embodiments, the network 116 can comprise various types of communications networks. For example, the network 116 can comprise the Internet. In another example, the network 116 can comprise a wide area network. The network 116 can comprise wired and/or wireless communications links The host server 102 provides a service to the tenant 104. In various embodiments, the host server 102 can provide various services to the tenant 104. For example, the host server 102 can provide a hosted email service to the tenant 104. The hosted email service can receive email messages addressed to accounts associated with the tenant 104 and can enable users associated with the tenant 104 to retrieve and view such emails. Furthermore, in this example, the hosted email service can send email messages from accounts associated with the tenant 104. In this example, the end user 106 can use a web browser or other application operating on the client device 110 to check and send email messages using the hosted email service provided by the host server 102.

In another example of a service that the host server 102 can provide to the tenant 104, the host server 102 can provide an office productivity application service to the tenant 104. Example office productivity applications include word processing applications, slide presentation applications, spreadsheet applications, note-taking applications, diagram drawing applications, database design applications, desktop publishing applications, software development applications, website design applications, graphics design applications, and other types of applications for creating and manipulating documents. In this example, the end user 106 can use a web browser or other application operating on the client device 110 to create and manipulate documents using the office productivity application service provided by the host server 102.

In yet another example of a service that the host server 102 can provide to the tenant 104, the host server 102 can provide a service for collaboration, file sharing, and web publishing. Among other functionality, this service can enable the tenant 104 to store, retrieve, and organize documents. MICROSOFT® SHAREPOINT® web services is one example of this type of service.

The host server 102 is operated by a hosting provider. The hosting provider is an entity other than the tenant 104. For example, the tenant 104 can be one corporation and the hosting provider can be a separate corporation. This can be an advantageous arrangement for the tenant 104 for various reasons. For example, the tenant 104 may not have the expertise to build and/or operate a server that provides the service provided by the host server 102. In this example, the hosting provider has such expertise. Furthermore, the host server 102 can provide the service to tenants in addition to the tenant 104. For example, the host server 102 can provide the service to the tenant 104 and several other corporations or entities. Because the same set of hardware (i.e., the host server 102) provides the service to multiple entities, the hosting provider may incur less total costs than if each of the tenants separately implemented servers that provide the service. The hosting provider can pass along the resulting savings to the tenants. In instances where the host server 102 provides the service to multiple entities, the host server 102 can appear to each of the entities as if the host server 102 provides the service exclusively to them. In other words, it can appear to the tenant 104 as if the host server 102 is providing the service exclusively to the tenant 104 when in fact the host server 102 is providing the service to one or more entities in addition to the tenant 104.

The administrator 108 uses the client device 112 to provide the configuration data 118 to the host server 102. The configuration data 118 identifies an external service. The external service is not provided by the host server 102.

In various embodiments, the configuration data 118 comprises various types of information. For example, the configuration data 118 can comprise a URL for an endpoint of a service provided by the local server 114.

In order to provide the service to the tenant 104, the host server 102 attempts to access an external service. The host server 102 attempts to access the external service due to the configuration data 118 identifying the external service. For example, the configuration data 118 can identify a URL associated with a given service provided by the local server 114. In this example, the host server 102 can determine that the given service is to be accessed because the configuration data 118 identifies the URL associated with the given service. In this example, if the configuration data 118 were to specify a different URL, the host server 102 attempts to access a service associated with this different URL instead of accessing the given service provided by the local server 114.

In addition to identifying an external service, the configuration data 118 can provide information that the host server 102 can use when communicating with an external service. For example, the host server 102 can use the local service provided by the local server 114 when performing a given operation. In this example, the configuration data 118 can comprise a security credential or token that the host server 102 is to use when communicating with the local server 114. In this example, the given operation is dependent on the configuration data 118 comprising the correct security credential or token.

The configuration data 118 does not necessarily that identifies external services provided by servers operated by the tenant 104. Rather, in some embodiments, the configuration data 118 can comprise data that identifies external services provided by servers operated by third parties. For instance, the system 100 can comprise a third-party server 120. The third-party server 120 is operated by an entity other than the tenant 104 and the entity that operates the host server 102. In some embodiments, the third-party server 120 is located at a premises of a third-party. The third-party server 120 provides a given service. In this example, the host server 102 performs a given operation that utilizes the given service. However, the host server 102 allows the tenant 104 to specify a URL associated with the given service. In this example, the configuration data 118 can comprise a URL of the given service provided by the third-party server 120.

In some circumstances, the configuration data 118 provided by the administrator 108 to the host server 102 can become inaccurate or insufficient. Consequently, errors can occur when the host server 102 attempts to access an external service identified by the configuration data 118. When errors occur, the host server 102 may be unable to provide some or all aspects of the service to the tenant 104. For example, the host server 102 can attempt to perform a given operation that uses the local service provided by the local server 114 to decrypt encrypted email messages. In this example, the configuration data 118 can identify the local service and specify a port associated with the local service. Furthermore, in this example, the administrator 108 changes the port associated with the local service after providing the configuration data 118 to the host server 102. Because the host server 102 is now using the wrong port to communicate with the local service when performing the given operation, the given operation fails. As a result, the end user 106 is not able to view decrypted email messages.

In other circumstances, the configuration data 118 provided by the administrator 108 to the host server 102 can be correct, but the host server 102 still may be unable to access an external service identified by the configuration data 118.

For example, the configuration data 118 may be accurate and sufficient, but the server providing the external service may be powered down. In another example, the configuration data 118 may be accurate and sufficient, but the server providing the external service might not have network connectivity.

The host server 102 detects errors that occur when the host server 102 attempts to access an external service identified by the configuration data 118. In response to detecting that an error has occurred when attempting to access an external service identified by the configuration data 118, the host server 102 sends a service access alert 122 to a recipient, such as the administrator 108 or the end user 106. The service access alert 122 notifies the recipient that the error has occurred. In the example of FIG. 1, the host server 102 sends the service access alert 122 via the network 116 to the client device 112 used by the administrator 108. In other embodiments, the host server 102 can send the service access alert 122 to the administrator 108 via other networks, such as a telephone network. In other embodiments, the host server 102 can send the service access alert 122 via the network 116 to the computing device 110 used by the end user 102.

In response to the service access alert 122, the administrator 108 can take steps to enable the host server 102 to access the external service. For example, the administrator 108 can provide updated configuration data to the host server 102, thereby rectifying the error. In another example, the administrator 108 can ensure that a server (e.g., the local service 114) providing the external service is operating properly. Furthermore, if the end user 106 receives the service access alert 122, the end user 106 may be able to plan ahead for the fact that the service provided by the host server 102 is not available.

Without the service access alert 122, the administrator 108 may not become aware of the error until the end user 106 complains to the administrator 108 about the error. Furthermore, without the service access alert 122, it may take the administrator 108 considerable time and effort to determine that the error relates to the host server 102 being unable to access an external service identified by the configuration data 118. Hence, receiving the service access alert 122 can be advantageous to the tenant 104 because the users associated with the tenant 104 may be able to access the service provided by the host server 102 with greater reliability. Furthermore, because the administrator 108 is notified of errors that are attributable to the host server 102 being unable to access an external service identified by the configuration data 118 provided by the administrator 108, the administrator 108 may be less likely to blame the hosting provider for the errors.

Figure 2:
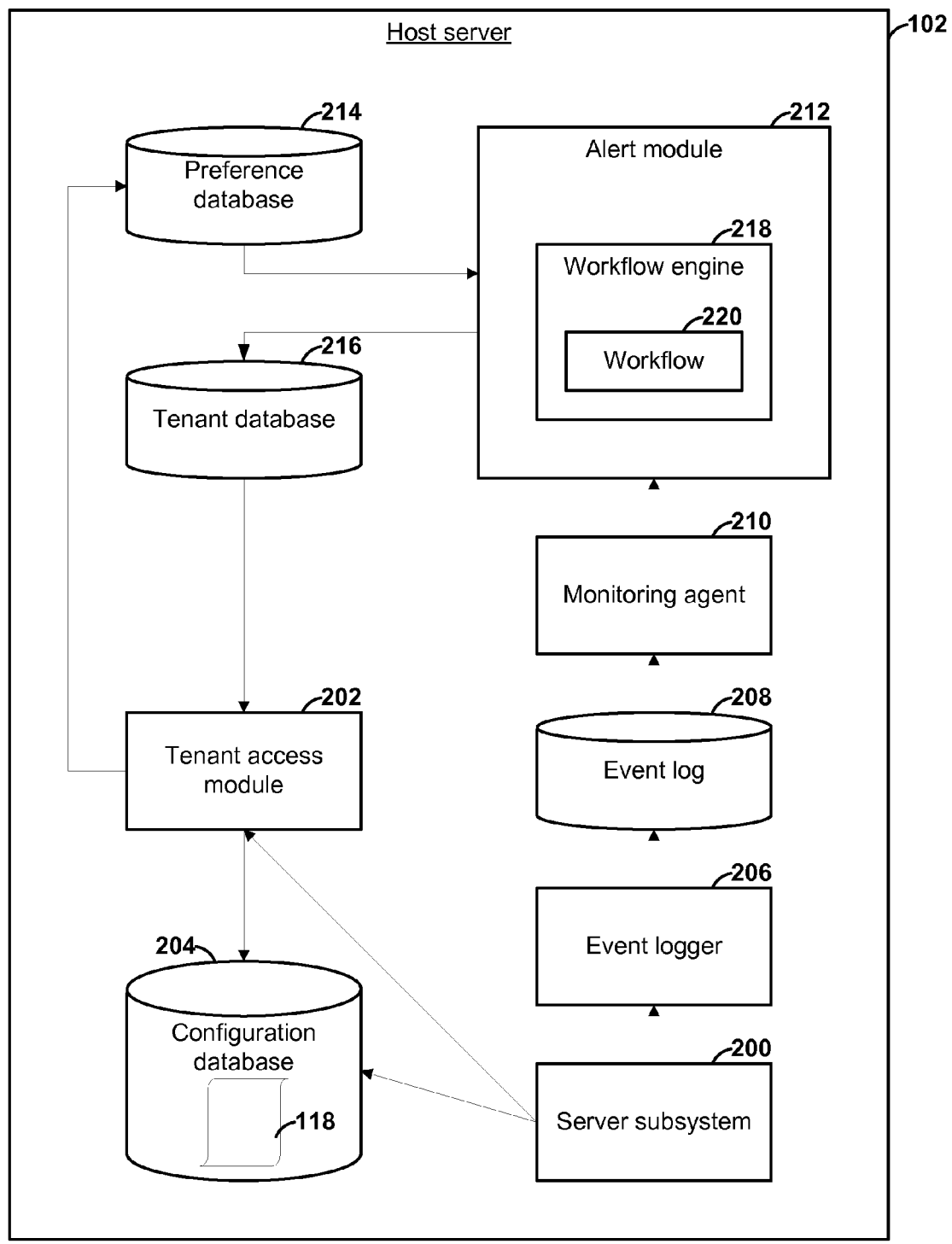
FIG. 2 is a block diagram illustrating example details of a host server.

FIG. 2 is a block diagram illustrating example details of the host server 102. As illustrated in the example of FIG. 2, the host server 102 comprises a server subsystem 200, a tenant access module 202, a configuration database 204, an event logger 206, an event log 208, a monitoring agent 210, an alert module 212, a preference database 214, and a tenant database 216.

The server subsystem 200 receives request messages from other computing devices. The request messages instruct the server subsystem 200 to perform an action on resources hosted by the server subsystem 200. The server subsystem 200 can receive request messages from a variety of other computing devices. For example, the server subsystem 200 can receive request messages from the client device 110, the client device 112, or other computing devices.

When the server subsystem 200 receives a request message, the server subsystem 200 performs one or more operations in response to the request message. For example, the client device 110 can send a request message to the server subsystem 200. In this example, the request message instructs the server subsystem 200 to send webpage data to the client device 110. The webpage data represents a webpage. In this example, the server subsystem 200 can perform one or more operations to dynamically generate the webpage data and send the webpage data to the client device 110.

The server subsystem 200 can host a variety of resources. For example, the server subsystem 200 can host web pages, multimedia feeds, mailboxes, and other types of resources. Furthermore, the resources hosted by the server subsystem 200 can include a tenant access website. The tenant access website comprises a set of webpages that enables the administrator 108 to submit configuration data 118 to the host server 102 and to view configuration data previously submitted to the host server 102. In this example, the server subsystem 200 uses the tenant access module 202 to host the tenant access website. For instance, when the server subsystem 200 receives a request to retrieve a web page in the tenant access website, the server subsystem 200 can use the tenant access module 202 to dynamically generate web page data representing the web page.

The server subsystem 200 can also receive request messages that comprise requests to submit the configuration data 118. When the server subsystem 200 receives such a request message, the server subsystem 200 uses one or more resources provided by the tenant access module 202 to process the configuration data 118 and store the resulting data in the configuration database 204. For instance, the tenant access module 202 can provide one or more web services, CGI scripts, applets, or other resources to process and store the configuration data 118.

Furthermore, the preference database 214 stores preference data for tenants of the host server 102. The server subsystem 200 can receive request messages that comprise requests to set preference data for tenants of the host server 102. A tenant's preference data governs how the host server 102 notifies the tenant regarding errors that occur when the server subsystem 200 attempts to perform operations that depend on the configuration data provided by the tenant. For example, the preference data for the tenant 104 can control the maximum number of service access alerts that the administrator 108 or other recipients want to receive in a day. In another example, the preference data for the tenant 104 can specify who is to receive service access alerts. In this example, the preference data for the tenant 104 can specify that the administrator 106 is to receive service access alerts. Furthermore, in this example, the preference data for the tenant 104 can specify that one or more end users associated with the tenant 104 are to receive service access alerts. In yet another example, the preference data for the tenant 104 can specify a preferred mode for receiving the service access alerts. In this example, the preference data for the tenant 104 can, for instance, specify email, SMS text message, RSS, or another delivery mode as a preferred mode for receiving service access alerts. When the server subsystem 200 receives a request to update a tenant's preference data, the server subsystem 200 uses one or more resources provided by the tenant access module 202 to update the tenant's preference data in the preference database 214.

The server subsystem 200 uses configuration data in the configuration database 204 when the server subsystem 200 performs some operations. For example, the configuration data in the configuration database 204 can comprise a URL of an encryption key distribution service provided by the local server 114. In this example, the server subsystem 200 can receive a request from the client device 110 to view an encrypted email message. In this example, the server subsystem 200 uses the URL to communicate with the local server 114 to obtain an encryption key needed to decrypt the encrypted email message.

Errors can occur when the server subsystem 200 performs operations in response to receiving request messages. Continuing the example of the previous paragraph, the configuration database 204 may contain an incorrect URL for the encryption key distribution service. In another example, the server subsystem 200 may be unable to communicate with the encryption key distribution service because the local server 114 has failed. In either of these examples, an error occurs because the server subsystem 200 is unable to obtain the encryption key from the encryption key distribution service, and hence is unable to decrypt the email message.

When an error occurs, the server subsystem 200 notifies the event logger 206 that the error has occurred. In response, the event logger 206 logs an event in the event log 208. The event comprises data regarding the error. For example, the event can comprise an error code for the error, a timestamp indicating a time at which the error occurred, and a text description of the error. In another example, the host server 102 provides the service to multiple tenants. In this example, when the error occurred while the server subsystem 200 was processing a request message associated with a given tenant, the event can comprise data that identifies the given tenant. In some embodiments, the event is logged in the event log 208 as an XML string. For example, the event can be logged as an XML string having the following format: <ExchangeEventInfo> <OrganizationID> [tenant-identifier] </OrganizationID> </ExchangeEventInfo>. In this example, the <ExchangeEventInfo> element contains attributes or sub-elements specifying data regarding the error. Furthermore, in this example, [tenant-identifier] represents an identifier for the tenant associated with the error.

The monitoring agent 210 monitors events in the event log 208. The monitoring agent 210 notifies the alert module 212 when the monitoring agent 210 detects a service access event in the event log 208. As used in this patent document, a service access event is an event that comprises data describing a service access error. Furthermore, as used in this patent document, a service access error is an error arising out of a failed attempt to access an external service identified by the configuration data 118. For instance, a service access error can occur during an operation because the configuration data 118 is inaccurate.

When the monitoring agent 210 sends an error notification to the alert module 212, the alert module 212 determines whether to send a service access alert to a recipient and, if so, how to send the service access alert to the recipient. In various embodiments, the alert module 212 determines whether and how to send a service access alert the recipient in various ways. For instance, in the example of FIG. 2, the monitoring agent 210 comprises a workflow engine 218. The workflow engine 218 comprises a software application that manages and executes modeled computer processes (i.e., workflows). The workflow engine 218 runs a workflow 220. The workflow 220 comprises a series of steps that determine whether and how to send the service access alert to the recipient.

As mentioned above, the preference database 214 stores preference data for tenants. A tenant's preference data governs how the host server 102 notifies the tenant regarding errors that occur when the server subsystem 200 attempts to perform operations that depend on the tenant's configuration data. The alert module 212 uses a tenant's preference data in the preference database 214 to determine how and whether to send a service access alert in response to the error. For example, if a particular type of error occurs when the server subsystem 200 performs an operation dependent on the configuration data 118 for the tenant 104, the alert module 212 can determine, based on the preference data for the tenant 104, that the administrator 108 prefers the alert module 212 to make an automated telephone phone call to the administrator 108. In this example, if the particular type of error occurs when the server subsystem 200 performs an operation dependent on another tenant's configuration data, the alert module 212 can determine, based on the other tenant's preference data, the other tenant's administrator prefers the alert module 212 to send a text message to the other tenant's administrator.

When the alert module 212 receives an error notification from the monitoring agent 210 regarding an error relating to the tenant 104, the alert module 212 stores a record of a service access alert for the tenant 104 in the tenant database 216. In some embodiments, the alert module 212 stores a record of the service access alert for the tenant 104 in the tenant database 216 even if the alert module 212 does not actually send the service access alert to the administrator 108 or other recipient. Subsequently, the server subsystem 200 can receive messages from the administrator 108 or other users requesting to view service access alerts stored in the tenant database 216. The server subsystem 200 can use one or more resources provided by the tenant access module 202 to retrieve records of service access alerts from the tenant database 216 and to provide data representing the service access alerts to the administrator 108 or other users.

In various embodiments, the server subsystem 200, the tenant access module 202, the event logger 206, the monitoring agent 210, and the alert module 212 can be implemented in various ways. For example, in some embodiments, one or more computer storage media store instructions that, when executed by one or more processing units in the host server 102, cause the host server 102 to provide the functionality of the server subsystem 200, the tenant access module 202, the event logger 206, the monitoring agent 210, and the alert module 212. In another example, some or all of the functionality of the server subsystem 200, the tenant access module 202, the event logger 206, the monitoring agent 210, and the alert module 212 can be implemented using application-specific integrated circuits.

Furthermore, in various embodiments, the configuration database 204, the event log 208, the preference database 214, and the tenant database 216 can be implemented in various ways. For example, the configuration database 204, the event log 208, the preference database 214, and the tenant database 216 can be implemented as relational databases, object-oriented databases, flat files, or other types of data structures for storing and retrieving data. Although the configuration database 204, the event log 208, the preference database 214, and the tenant database 216 are shown as being separate in the example of FIG. 2, one or more of the configuration database 204, the event log 208, the preference database 214, and the tenant database 216 can be implemented in the same database. For example, the configuration database 204 and the preference database 214 can be implemented as a single relational database.

Figure 3:
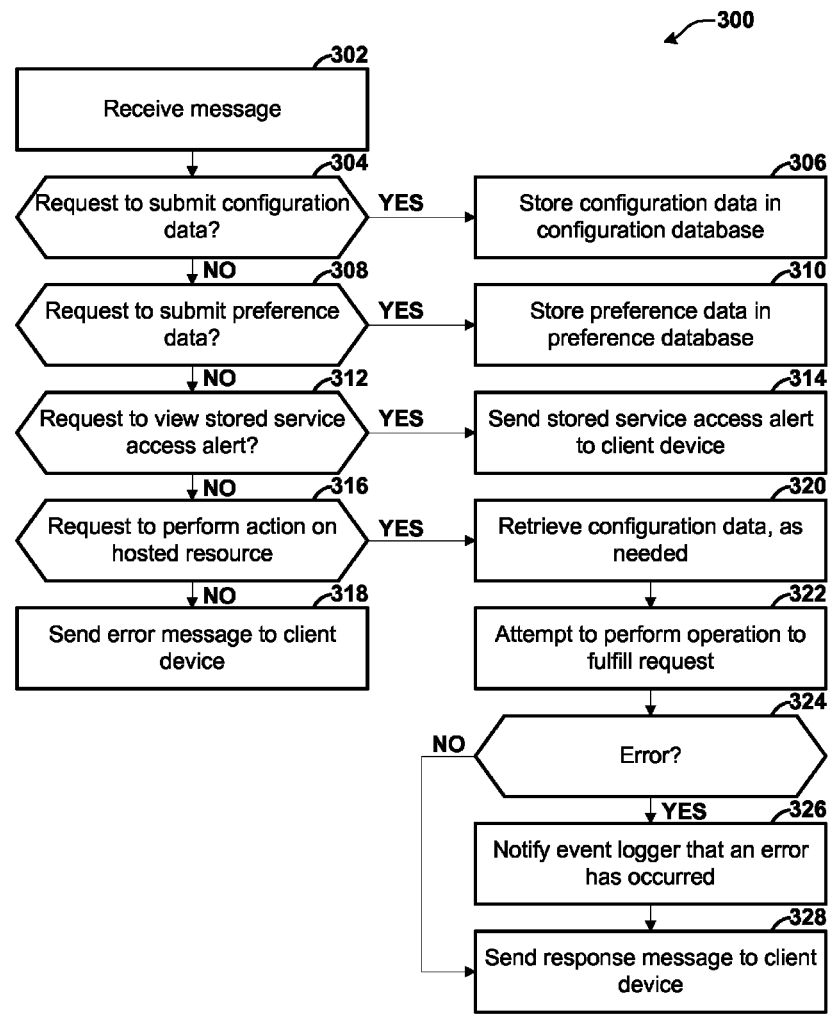
FIG. 3 is a flowchart illustrating an example operation performed by a server subsystem to provide a service.

FIG. 3 is a flowchart illustrating an example operation 300 performed by the server subsystem 200 to provide the service. As illustrated in the example of FIG. 3, the operation 300 begins when the server subsystem 200 receives a message from another computing device (302). For example, the operation 300 can begin when the server subsystem 200 receives a message from the client device 110, the client device 112, or another computing device. In various embodiments, the server subsystem 200 can receive the message via various interfaces and the message can be formatted in various ways. For example, in some embodiments, the server subsystem 200 can receive the message via a POWERSHELL™ interface, a MICROSOFT® Exchange Web Services interface, a MICROSOFT® Exchange Control Panel interface, a webpage-based interface, a SSH-based interface, and/or another type of interface. In this example, the server subsystem 200 may be able to receive some messages via some of these interfaces, but not others.

In response to receiving the message, the server subsystem 200 determines whether the received message comprises a request from the administrator 108 to submit configuration data (e.g., the configuration data 118) (304). If the received message comprises a request to submit configuration data for a tenant (e.g., the tenant 104) ("YES" of 304), the server subsystem 200 stores the configuration data in the configuration database 204 (306). In embodiments where the server subsystem 200 provides a POWERSHELL™ interface, the administrator 108 can use the "Set-IRMConfiguration" command to submit configuration data for the tenant 104. For example, the administrator 108 or a batch program can enter "Set-IRMConfiguration—LicensingLocation http://contoso.com/rms" in a POWERSHELL™ interface to indicate that "http://contoso.com/rms" is a location of an external licensing service.

If the received message does not comprise a request to submit configuration data ("NO" of 308), the server subsystem 200 determines whether the received message comprises a request to submit preference data (308). If the received message comprises a request to submit preference data ("YES" of 308), the server subsystem 200 stores the preference data in the preference database 214 (310).

If the received message does not comprise a request to submit preference data ("NO" of 308), the server subsystem 200 determines whether the received message comprises a request to view one or more stored service access alerts (312). As described briefly above with regard to the example of FIG. 2, the alert module 212 stores records of service access alerts into the tenant database 216. If the server subsystem 200 determines that the received message comprises a request to view one or more stored service access alerts ("YES" of 312), the server subsystem 200 sends data representing the stored one or more service access alerts to a client device that sent the received message (314). As shown in the example of FIG. 2, the server subsystem 200 can use the tenant access module 202 to retrieve the stored service access alerts from the tenant database 216. In various embodiments, the server subsystem 200 can send data representing the stored service access alerts in various ways. For example, the server subsystem 200 can send web page data that represents one or more webpages containing the stored service access alerts. In another example, the server subsystem 200 can send data representing the stored service access alerts in messages to on-premises monitoring software used by the administrator 108.

On the other hand, if the server subsystem 200 determines that the received message does not comprise a request to view one or more stored service access alerts ("NO" of 312), the server subsystem 200 determines whether the received message comprises a request to perform an action on a given resource hosted by the server subsystem 200 (316). The given resource is a resource other than the resources used to submit configuration or preference data. For example, the received message can comprise a request to retrieve webpage data that represents a webpage hosted by the server subsystem 200. In another example, the resource request can comprise a request to retrieve data that an application running on the client device can interpret to display information to a user of the client device. In yet another example, the received message can comprise a request to post or put information to the host server 102 using a resource hosted by the server subsystem 200. In yet another example, the received message can comprise a request to send or retrieve an email message. In yet another example, the received message can comprise a request to save a new or existing document at the host server 102.

If the received message does not comprise a request to perform an action on the given resource ("NO" of 316), the server subsystem 200 sends an error message to the client device (318). It should be appreciated that in other embodiments, the server subsystem 200 can receive and process messages comprising types of requests other than those described in the example of FIG. 3.

On the other hand, if the request message comprises a request to perform an action on the given resource hosted by the server subsystem 200 ("YES" of 316), the server subsystem 200 retrieves applicable configuration data from the configuration database 204 (320). The applicable configuration data is configuration data that the server subsystem 200 uses when performing the action on the given resource. For example, the applicable configuration data can comprise a URL of a key distribution service provided by the local server 114. The server subsystem 200 then attempts to perform one or more operations needed to the complete the requested action on the given resource (322). The operations can attempt to access one or more external services identified by the applicable configuration data. Continuing the previous example, the server subsystem 200 can attempt to retrieve an encryption key from the local server 114 as part of an operation to decrypt an email message.

During or after attempting to perform the operations, the server subsystem 200 determines whether an error has occurred in attempting to perform the operations (324). For example, if the server subsystem 200 attempts to retrieve an encryption key from the local server 114 as part of an operation to decrypt an email message and the server subsystem 200 is unable to retrieve the encryption key, the server subsystem 200 determines that an error has occurred in attempting to perform this operation.

If an error has occurred ("YES" of 324), the server subsystem 200 notifies the event logger 206 that the error has occurred (326). After notifying the event logger 206 or after determining that no error has occurred ("NO" of 324), the server subsystem 200 sends a response message to the client device (328). The content of the response message can depend on whether an error occurred. For example, the response message can include data that indicates that the error occurred. In this example, if no error occurred and the received message comprised a request for the webpage, the response message can contain webpage data representing the web page.

Figure 4:
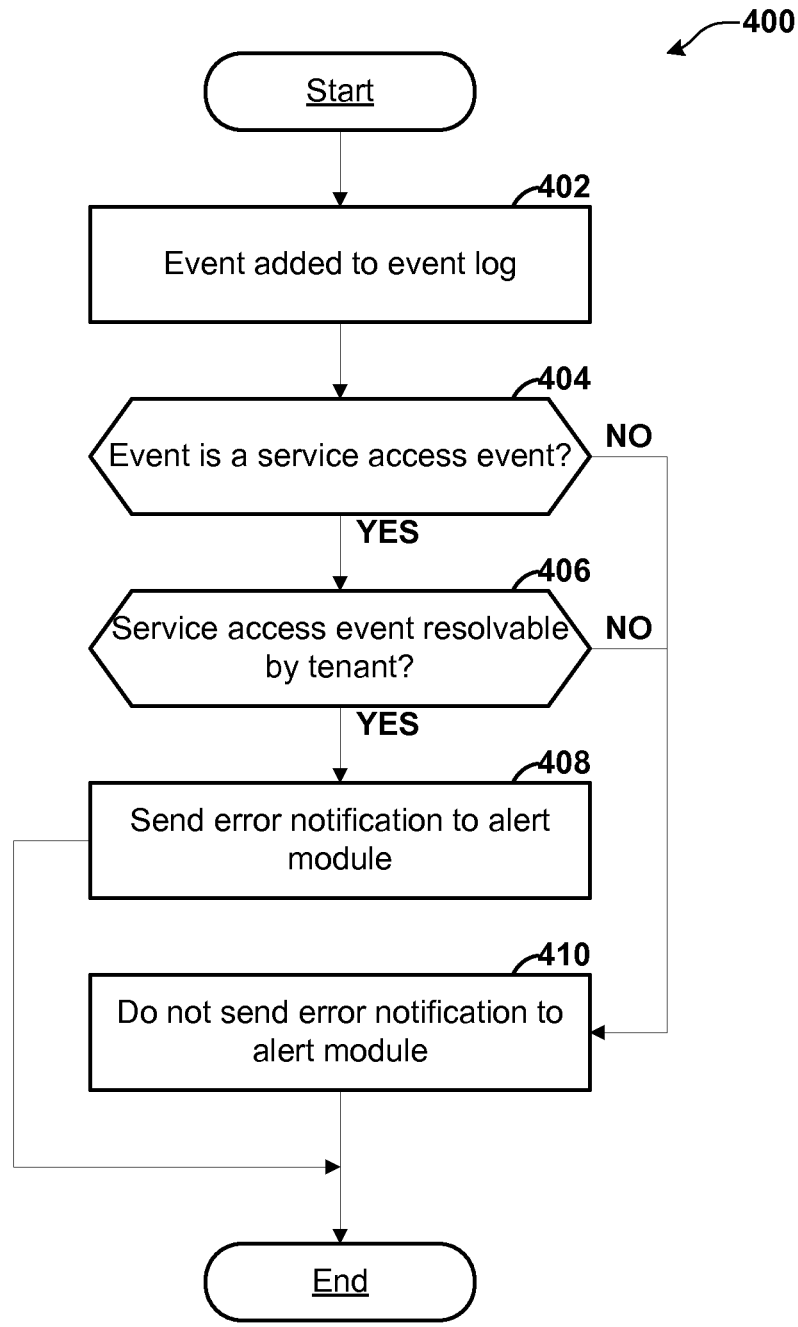
FIG. 4 is a flowchart illustrating an example operation performed by a monitoring agent at the host server.

FIG. 4 is a flowchart illustrating an example operation 400 performed by the monitoring agent 210. As illustrated in the example of FIG. 4, the operation 400 starts when the monitoring agent 210 detects that an event was added to the event log 208 (402). In response, the monitoring agent 210 determines whether the event is a service access event (404). As mentioned above, a service access event is an event that comprises data describing an error arising out of an operation that attempts to access an external service identified by the configuration data 118.

If the monitoring agent 210 determines that the event is a service access event ("YES" of 404), the monitoring agent 210 performs one or more checks to determine whether the event describes an error that is resolvable by the tenant 104 (406). In various embodiments, the monitoring agent 210 can perform various checks to determine whether the error is resolvable by the tenant 104. For example, the error can occur if the host server 102 loses connectivity to the network 116. This type of error is not resolvable by the tenant 104. In this example, when the host server 102 loses connectivity to the network 116, the event log 208 may contain a series of events that indicate that the server subsystem 200 was unable to communicate with servers provided by each tenant. Accordingly, in this example, the monitoring agent 210 can check whether the event log 208 contains a series of events that indicate that the server subsystem 200 was unable to communicate with servers provided by different tenants.

If the event describes an error that is resolvable by the tenant 104 ("YES" of 406), the monitoring agent 210 sends an error notification to the alert module 212 (408). The error notification notifies the alert module 212 that a service access error has occurred. If the error is not resolvable by the tenant 104 ("NO" of 406) or if the event is not a service access event ("NO" of 404), the monitoring agent 210 does not send an error notification to the alert module 212 (410). Consequently, the alert module 212 refrains from sending a service access alert to the administrator 108 or other recipients when the error is not resolvable by the tenant 104 or when the event is not a service access event.

Figure 5:
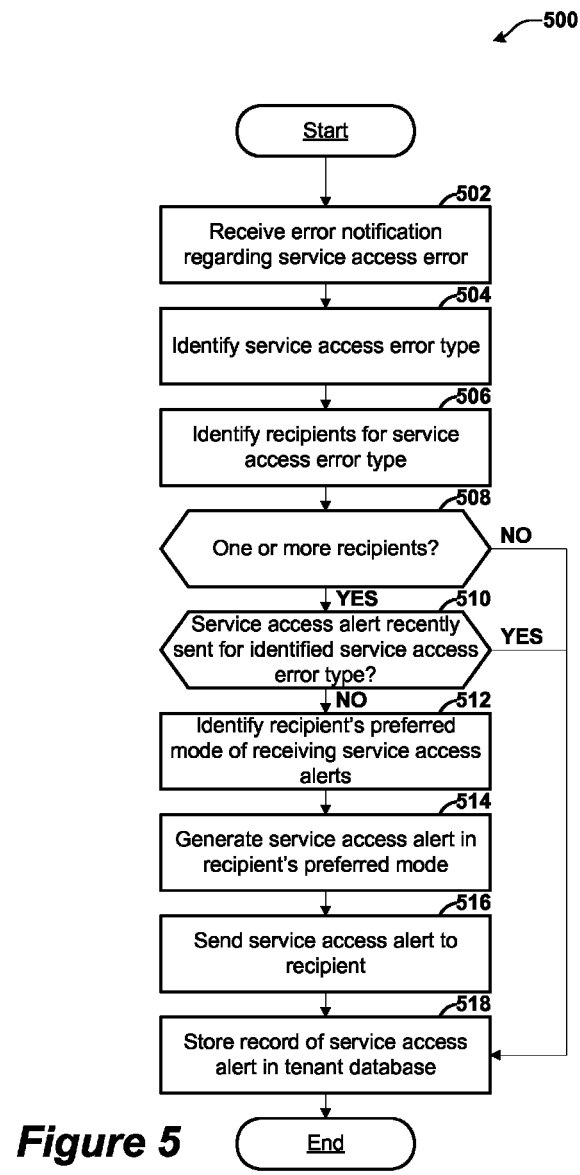
FIG. 5 is a flowchart illustrating an example operation performed by an alert module at the host server.

FIG. 5 is a flowchart illustrating an example operation 500 performed by the alert module 212. For ease of explanation, the example of FIG. 5 is explained with regard to the tenant 104. However, the alert module 212 could also perform the operation 500 with regard to other tenants of the host server 102.

As illustrated in the example of FIG. 5, the operation 500 begins when the alert module 212 receives an error notification from the monitoring agent 210 regarding a service access error (502). In response to receiving the error notification from the monitoring agent 210, the alert module 212 identifies a service access error type for the service access error (504). The alert module 212 can identify the service access error as belonging to a variety of different service access error types. Such service access error types can include communication failure errors, data corruption errors, authorization errors, and so on. In this example, communication failure errors occur when the host server 102 is unable to communicate with an external service specified by the configuration data 118. Data corruption errors occur when the host server 102 is able to communicate with an external service specified by the configuration data 118, but the external service returns data that the server subsystem 200 is unable to use. In this example, authorization errors occur when the host server 102 is able to communicate with an external service specified by the configuration data 118, but the external service prevents the host server 102 from using the external service on grounds that the host server 102 is not authorized to use the external service.

In various embodiments, the alert module 212 identifies the service access error type in various ways. For example, the error notification from the monitoring agent 210 can comprise a code that specifies the service access error type. In this example, the alert module 212 uses this code to identify the service access error type. In another example, the error notification from the monitoring agent 210 comprises the service access event. In this example, the alert module 212 maintains a mapping between types of service access events and service access error types. The alert module 212 uses this mapping to identify the service access error type from the service access event.

After identifying the service access error type, the alert module 212 identifies recipients for service access alerts regarding the identified service access error type (506). For example, the administrator 108 may want to receive service access alerts regarding failures to communicate with an encryption key server provided by the local server 114, but does not want to receive service access alerts regarding corrupted data at the local server 114. In another example, the tenant 104 may want one or more end users (e.g., the end user 106) to receive service access alerts regarding the identified service access error type.

In various embodiments, the alert module 212 identifies recipients for service access alerts regarding the identified service access error type in various ways. For example, the server subsystem 200 can host webpages that enable the administrator 108 to store preference data in the preference database 214. These webpages can include one or more webpages that enable the administrator 108 to specify a list of recipients (e.g., users) who are to receive service access alerts regarding particular service access error types. This list can include the administrator 108. Furthermore, this list can include contact information (e.g., email addresses, phone numbers, etc.) for the recipients on this list. In this example, the alert module 212 uses the preference data stored in the preference database 214 to determine who, if anyone, is to receive service access alerts for the identified service access error type.

In some instances, there may be no recipients for service access alerts regarding the identified service access error type. Hence, prior to performing further actions, the alert module 212 determines whether there are one or more recipients for service access alerts regarding the identified service access error type (508).

A recipient, such as the administrator 108, may not want to receive a service access alert if the recipient recently received a service access alert for the same service access error type. For example, if the server subsystem 200 is unable to communicate with the local server 114 and the server subsystem 200 attempts to communicate with the local server 114 each time the server subsystem 200 receives an incoming email message, the event logger 206 could produce a separate event each time the server subsystem 200 receives an email message. In this example, it would only be helpful to a recipient to receive one service access alert regarding this problem, as opposed to each time the server subsystem 200 receives an email message. However, it may be helpful to the recipient to receive a service access alert if this problem recurs at a later time. Hence, if the alert module 212 determines that there are one or more recipients for service access alerts regarding the identified type of service access error ("YES" of 508), the alert module 212 determines whether the alert module 212 recently sent to the recipient a service access alert regarding an error belonging to the identified service access error type (510).

In various embodiments, the alert module 212 can determine in various ways whether the alert module 212 recently sent to the recipient a service access alert regarding the identified service access error type. For example, the alert module 212 can comprise programming that causes the alert module 212 to determine that the alert module 212 has not recently sent a service access alert to the recipient when the alert module 212 has not sent to the recipient a service access alert regarding the identified service access error type within the last twenty-four hours or another time period. In another example, the length of time between when the alert module 212 can send service access alerts regarding service access errors belonging to the same service access error type is established by the recipient and stored as part of the configuration data for the tenant 104.

If the alert module 212 has not recently sent to the recipient a service access alert regarding a service access error belonging to the identified service access error type ("NO" of 510), the alert module 212 identifies the recipient's preferred mode of receiving service access alerts (512). The alert module 212 uses preference data in the preference database 214 to identify the recipient's preferred mode of receiving service access alerts. In various embodiments, the preference data for the recipient can specify various modes of receiving service access alerts. For example, the preference data for the recipient can specify email messages, SMS text messages, entries published to a web feed system (such as RSS or Atom), automated telephone calls, pager calls, or other types of messages as preferred modes of receiving service access alerts. In a further example, the recipient can use on-premises monitoring software, such as MICROSOFT® System Center Operation Manager (SCOM). The on-premises monitoring software runs on a computing device operated by the tenant 104, such as the client device 112 or the local server 114. In this example, the preference data for the recipient can specify sending messages to the on-premises monitoring software is the recipient's preferred mode of receiving service access alerts.

In some embodiments, the preference data can specify multiple preferred modes of receiving service access alerts. For example, the preference data can specify that the recipient wants to receive SMS text messages and messages to on-premises monitoring software. Furthermore, in some embodiments, the preference data can specify that the recipient has different preferred modes of receiving service access alerts for different service access error types. For example, the preference data can specify that SMS text messages are the recipient's preferred mode for one service access error type and that email messages are the recipient's preferred mode for another service access error type.

Next, the alert module 212 generates a service access alert in the recipient's preferred mode of receiving service access alerts (514). The alert module 212 then sends the service access alert to the recipient (516). For example, if the recipient's preferred mode of receiving service access alerts is via SMS text message, the alert module 212 generates and sends an SMS text message. Depending on the recipient's preferred mode of receiving service access alerts, the service access alert can have different content. For example, if the service access alert is an email message, the service access alert can contain a full description of the service access error. In some embodiments, the alert module 212 dynamically identifies a preferred language for the recipient. In such embodiments, the full description is in the preferred language for the recipient. For instance, if the preferred language of the recipient is German, the alert module 212 sends the full description in German. In this example, the alert module 212 can generate the description by filling appropriate data at predefined locations within a template. In another example, if the service access alert is an SMS text, the service access alert can contain a brief message indicating that a service access error has occurred and can contain a link to a webpage that contains a more complete description of the service access error. In yet another example, the service access alert can include a link (e.g., a hyperlink, page reference, etc.) to information intended to help the recipient resolve the service access error.

If there are no recipients for service access alerts regarding the identified service access error type ("NO" of 508), or if a service access alert regarding an error belonging to the identified service access error type was recently sent to the recipient ("YES" of 510), the alert module 212 refrains from sending a service access alert to the recipient, but stores a record of the service access alert in the tenant database 216 (518). The alert module 212 also stores a record of the service access alert in the tenant database 216 after the alert module 212 sends the service access alert to the administrator in step 514. As described above, the administrator 108 can use a variety of systems to view service access alerts stored in the tenant database 216. The alert module 212 can perform the steps 510, 512, 514, and 516 for each of the identified recipients for service access alerts regarding the identified service access error type.

Figure 6:
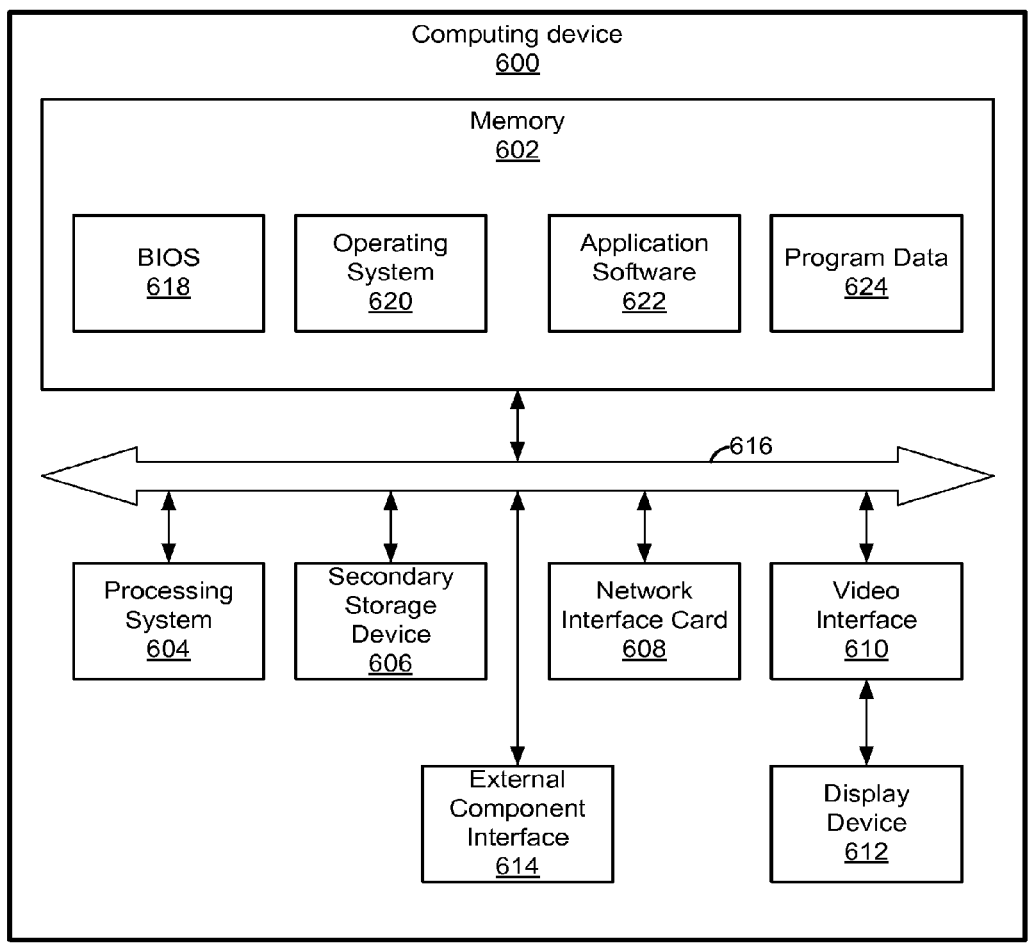
FIG. 6 is a block diagram illustrating an example computing device.

FIG. 6 is a block diagram illustrating an example computing device 600. In some embodiments, the host server 102, the client device 110, the client device 112, the local server 114, and the third-party server 120 are implemented using one or more computing devices like the computing device 600. It should be appreciated that in other embodiments, the host server 102, the client device 110, the client device 112, the local server 114, and/or the third-party server 120 are implemented using computing devices having hardware components other than those illustrated in the example of FIG. 6.

The term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In the example of FIG. 6, the computing device 600 comprises a memory 602, a processing system 604, a secondary storage device 606, a network interface card 608, a video interface 610, a display unit 612, an external component interface 614, and a communication medium 616. The memory 602 includes one or more computer storage media capable of storing data and/or instructions. In different embodiments, the memory 602 is implemented in different ways. For example, the memory 602 can be implemented using various types of computer storage media.

The processing system 604 includes one or more processing units. A processing unit is a physical device or article of manufacture comprising one or more integrated circuits that selectively execute software instructions. In various embodiments, the processing system 604 is implemented in various ways. For example, the processing system 604 can be implemented as one or more processing cores. In another example, the processing system 604 can comprise one or more separate microprocessors. In yet another example embodiment, the processing system 604 can comprise an application-specific integrated circuit (ASIC) that provides specific functionality. In yet another example, the processing system 604 provides specific functionality by using an ASIC and by executing computer-executable instructions.

The secondary storage device 606 includes one or more computer storage media. The secondary storage device 606 stores data and software instructions not directly accessible by the processing system 604. In other words, the processing system 604 performs an I/O operation to retrieve data and/or software instructions from the secondary storage device 606. In various embodiments, the secondary storage device 606 comprises various types of computer storage media. For example, the secondary storage device 606 can comprise one or more magnetic disks, magnetic tape drives, optical discs, solid state memory devices, and/or other types of computer storage media.

The network interface card 608 enables the computing device 600 to send data to and receive data from a communication network. In different embodiments, the network interface card 608 is implemented in different ways. For example, the network interface card 608 can be implemented as an Ethernet interface, a token-ring network interface, a fiber optic network interface, a wireless network interface (e.g., WiFi, WiMax, etc.), or another type of network interface.

The video interface 610 enables the computing device 600 to output video information to the display unit 612. The display unit 612 can be various types of devices for displaying video information, such as a cathode-ray tube display, an LCD display panel, a plasma screen display panel, a touch-sensitive display panel, an LED screen, or a projector. The video interface 610 can communicate with the display unit 612 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 614 enables the computing device 600 to communicate with external devices. For example, the external component interface 614 can be a USB interface, a FireWire interface, a serial port interface, a parallel port interface, a PS/2 interface, and/or another type of interface that enables the computing device 600 to communicate with external devices. In various embodiments, the external component interface 614 enables the computing device 600 to communicate with various external components, such as external storage devices, input devices, speakers, modems, media player docks, other computing devices, scanners, digital cameras, and fingerprint readers.

The communications medium 616 facilitates communication among the hardware components of the computing device 600. In the example of FIG. 6, the communications medium 616 facilitates communication among the memory 602, the processing system 604, the secondary storage device 606, the network interface card 608, the video interface 610, and the external component interface 614. The communications medium 616 can be implemented in various ways. For example, the communications medium 616 can comprise a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 602 stores various types of data and/or software instructions. For instance, in the example of FIG. 6, the memory 602 stores a Basic Input/Output System (BIOS) 618 and an operating system 620. The BIOS 618 includes a set of computer-executable instructions that, when executed by the processing system 604, cause the computing device 600 to boot up. The operating system 620 includes a set of computer-executable instructions that, when executed by the processing system 604, cause the computing device 600 to provide an operating system that coordinates the activities and sharing of resources of the computing device 600. Furthermore, the memory 602 stores application software 622. The application software 622 comprises computer-executable instructions, that when executed by the processing system 604, cause the computing device 600 to provide one or more applications. The memory 602 also stores program data 624. The program data 624 is data used by programs that execute on the computing device 600.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can include the steps of the operations shown in the figures in different orders.

What is claimed is:

1. A computer storage medium not consisting of a propagated data signal, the computer storage medium comprising computer executable instructions that, when executed by at least one processor, perform a method comprising:
   providing, by a server system operated by a hosting provider, a first service to a tenant;
   receiving, by the server system, configuration data from the tenant, the configuration data identifying an external service, the server system not providing the external service;
   attempting, by the server system, to access the external service as part of providing the first service to the tenant, wherein the server system attempts to access the external service due to the configuration data identifying the external service; and
   in response to determining that a service access error has occurred when attempting to access the external service, sending a service access alert to a recipient associated with the tenant, the service access alert notifying the recipient that the service access error has occurred.

2. The computer storage medium of claim 1, wherein attempting to access the external service comprises attempting, by the server system, to communicate over a communications network with a server that provides the external service.

3. The computer storage medium of claim 2, the server identified by the configuration data located on a premises of the tenant.

4. The computer storage medium of claim 2, the server identified by the configuration data located on a premises of a third party.

5. The computer storage medium of claim 1, wherein sending the service access alert to the recipient comprises sending a message to on-premises monitoring software.

6. The computer storage medium of claim 1, wherein sending the service access alert to the recipient comprises at least one of: sending an email message to the recipient, sending a SMS text message to the recipient, making a telephone call to the recipient, and publishing an entry on a web feed system.

7. The computer storage medium of claim 1, wherein sending the service access alert comprises identifying a preferred language of the recipient, wherein the service access alert comprises a description of the service access error, the description being in the identified language.

8. The storage device of claim 1, wherein the service access alert comprises a link to information intended to help the recipient resolve the service access error.

9. The storage device of claim 1, wherein the first service is a hosted email service.

10. The computer storage medium of claim 1, further comprising:
receiving, by the server system, a request to submit preference data, the preference data indicating a mode of receiving service access alerts; and
in response to determining that the service access error has occurred when attempting to access the external service, generating, by the server system, the service access alert in the indicated mode.

11. The computer storage medium of claim 1, further comprising:
storing, by the server system, a record of the service access alert in a tenant database;
receiving, by the server system, a request to view the service access alert; and
in response to receiving the request, sending, by the server system, data representing the service access alert to a client device that sent the request.

12. A method comprising:
providing, by a server system, a first service to a tenant;
receiving an identification of an external service, the server system not providing the external service;
attempting, by the server system, to access the external service as part of providing the first service to the tenant; and
when a service access error has occurred when attempting to access the external service, determining whether the service access error is resolvable by the tenant; and
when the service access error is resolvable by the tenant, sending a service access alert to a recipient associated with the tenant, the service access alert notifying the recipient that the service access error has occurred.

13. The method of claim 12, further comprising storing the error in an event log.

14. The method of claim 12, further comprising when the service error access is not resolvable by the tenant, refraining from sending the service access alert to the recipient.

15. The method of claim 12 wherein sending the service access alert to the recipient comprises sending an email message to the recipient, sending a SMS text message to the recipient, making a telephone call to the recipient, or publishing an entry on a web feed system.

16. The method of claim 12 wherein sending the service access alert comprises: identifying a preferred language of the recipient, wherein the service access alert comprises a description of the service access error, the description being in the identified language.

17. The method of claim 12, wherein the first service is a hosted email service.

18. The method of claim 12, further comprising:
receiving, by the server system, a request to submit preference data, the preference data indicating a mode of receiving service access alerts; and
in response to determining that the service access error has occurred, generating, by the server system, the service access alert in the indicated mode.

19. The method of claim 12, further comprising:
storing, by the server system, a record of the service access alert in a tenant database;
receiving, by the server system, a request to view the service access alert; and
in response to receiving the request, sending, by the server system, data representing the service access alert to a client device that sent the request.

20. A server system comprising:
one or more computing devices, the one or more computing devices comprising processing units that execute computer-executable instructions, execution of the computer-executable instructions causing the server system to:
provide, by the server system, a first service to a tenant;
receive an identification of an external service, the server system not providing the external service;
attempt, by the server system, to access the external service as part of providing the first service to the tenant; and
when a service access error has occurred when attempting to access the external service, send a service access alert to a recipient associated with the tenant, the service access alert notifying the recipient that the service access error has occurred.

* * * * *